(12) United States Patent
He et al.

(10) Patent No.: US 11,619,455 B2
(45) Date of Patent: Apr. 4, 2023

(54) OUTER FINNED TUBE WITH MIXED-WETTABILITY SURFACE AND MANUFACTURING METHOD THEREOF

(71) Applicant: South China University of Technology, Guangzhou (CN)

(72) Inventors: Zicong He, Guangzhou (CN); Zhenping Wan, Guangzhou (CN); Hanping Chen, Guangzhou (CN); Xiqian Song, Guangzhou (CN); Guanghui Zhan, Guangzhou (CN)

(73) Assignee: South China University of Technology, Guangzhou (CN)

( * ) Notice: Subject to any disclaimer, the term of this patent is extended or adjusted under 35 U.S.C. 154(b) by 160 days.

(21) Appl. No.: 17/170,849

(22) Filed: Feb. 8, 2021

(65) Prior Publication Data
US 2021/0348854 A1    Nov. 11, 2021

(30) Foreign Application Priority Data
May 7, 2020    (CN) .......................... 202010377768.6

(51) Int. Cl.
| | |
|---|---|
| F28F 1/12 | (2006.01) |
| B21D 53/02 | (2006.01) |
| F25B 39/02 | (2006.01) |
| F28F 13/18 | (2006.01) |
| F28F 21/08 | (2006.01) |
| B21D 53/06 | (2006.01) |
| B23P 15/26 | (2006.01) |

(52) U.S. Cl.
CPC ................ *F28F 1/12* (2013.01); *B21D 53/02* (2013.01); *B21D 53/022* (2013.01);
(Continued)

(58) Field of Classification Search
CPC ......... Y10T 29/49377; Y10T 29/49378; Y10T 29/49382; Y10T 29/49385; F28F 1/10;
(Continued)

(56) References Cited

U.S. PATENT DOCUMENTS

| | | | | |
|---|---|---|---|---|
| 4,313,248 A | * | 2/1982 | Fujikake | ............... F28F 13/187 72/122 |
| 6,067,832 A | * | 5/2000 | Brand | ................... B21C 37/207 72/98 |
| 6,786,072 B2 | * | 9/2004 | Beutler | ................. B21C 37/207 72/98 |

(Continued)

FOREIGN PATENT DOCUMENTS

CN    111707122 A    9/2020

*Primary Examiner* — Jason L Vaughan
(74) *Attorney, Agent, or Firm* — True Shepherd LLC; Andrew C. Cheng

(57) ABSTRACT

An outer finned tube includes a tube body, an outer wall of the tube body is provided with outer fins spirally arranged in an extension direction of the tube body; grid fins are arranged between two adjacent spiral parts of the outer fins correspondingly; two ends of each grid fin are connected to the two adjacent spiral parts of the corresponding outer fin respectively; a gap is kept between each grid fin and the outer wall of the tube body; and the plurality of grid fins are spaced in the extension direction of the tube body. An enhancing cavity is formed in an area defined by the outer wall of the tube body, inner walls of the grid fins and the outer fins in an encircling way, which can form a larger degree of superheat, provides a nucleation point for a boiling/condensation process and improves a heat exchange performance.

1 Claim, 2 Drawing Sheets

(52) U.S. Cl.
CPC ........... *B21D 53/027* (2013.01); *B21D 53/06* (2013.01); *B23P 15/26* (2013.01); *F25B 39/02* (2013.01); *F28F 13/182* (2013.01); *F28F 21/085* (2013.01)

(58) Field of Classification Search
CPC ........ F28F 1/12; F28F 1/16; F28F 1/18; F28F 1/24; F28F 1/26; F28F 1/34; F28F 1/36
See application file for complete search history.

(56) References Cited

U.S. PATENT DOCUMENTS

| | | | |
|---|---|---|---|
| 7,762,318 B2 * | 7/2010 | Yu | F28F 13/187 165/184 |
| 7,789,127 B2 * | 9/2010 | Lu | F28F 1/26 165/184 |
| 8,069,676 B2 * | 12/2011 | Kamen | B01D 5/006 62/291 |
| 8,091,616 B2 * | 1/2012 | Lu | F28F 1/422 165/184 |
| 8,162,039 B2 * | 4/2012 | Cao | F28F 13/187 165/184 |
| 9,096,942 B2 | 8/2015 | Joung et al. | |
| 10,100,411 B2 | 10/2018 | Frankiewicz et al. | |
| 10,416,063 B2 | 9/2019 | Gao et al. | |

\* cited by examiner

OUTER FINNED TUBE WITH MIXED-WETTABILITY SURFACE AND MANUFACTURING METHOD THEREOF

CROSS-REFERENCE TO RELATED APPLICATIONS

This application claims priority to Chinese Patent Application No. 202010377768.6 with a filing date of May 7, 2020. The content of the aforementioned applications, including any intervening amendments thereto, are incorporated herein by reference.

TECHNICAL FIELD

The present disclosure relates to the technical field of enhanced heat transfer tubes, and in particular to an outer finned tube with a mixed-wettability surface and a manufacturing method thereof.

BACKGROUND

Energy plays a crucial role in the development of modern civilization. With development of global economy and science, we have explosively increasing demands in energy, followed with increasingly severe shortage of energy. Enhanced heat transfer can effectively improve heat transfer efficiency and lighten and miniaturize heat transfer devices, and a device with a high energy density can run stably by adopting a more efficient heat dissipation technology, thus energy is saved and emissions are reduced. Therefore, enhanced heat transfer technologies became a new research hotspot in 1960s.

At present, most of existing outer finned tubes applied industrially are two-dimensional structures, such as sleeved finned tubes, wound finned tubes, and rolled finned tubes. In recent years, with significant development of processing technologies, three-dimensional outer finned tubes, as a third generation of heat transfer technology, have been widely applied to the field of heat exchangers. Compared with one-dimensional and two-dimensional outer finned tubes, a three-dimensional outer finned tube has a rougher surface and a larger heat exchange area. However, a conventional heat exchange tube has different parameter optimizations under a boiling (evaporation) work condition and a condensation working condition. Generally, an evaporation tube and a condensation tube cannot be replaced by each other in use.

SUMMARY

To solve the technical problems in the prior art, one objective of the present disclosure is to provide an outer finned tube with a mixed-wettability surface. In this outer finned tube, an outer surface of a tube body is sequentially provided with an enhancing cavity and an evaporation cavity from inside to outside. The enhancing cavity has a higher degree of superheat, and the evaporation cavity has a larger heat transfer surface. The enhancing cavity communicates with the evaporation cavity. In this way, a heat transfer resistance is reduced, a heat transfer efficiency is improved, and both evaporation and condensation heat transfer performance are improved. Therefore, the outer finned tube can be applied to an evaporator as an evaporation tube or applied to a condenser as a condensation tube, can be used as a dual-purpose tube, and provides a key condition for development of heat pump units.

To solve the technical problems in the prior art, another objective of the present disclosure is to provide a method for manufacturing an outer finned tube with a mixed-wettability surface. According to this method, an enhancing cavity with a higher degree of superheat and an evaporation cavity with a larger heat transfer area are sequentially formed on an outer surface of a tube body from inside to outside. Therefore, the outer finned tube can be applied to an evaporator as an evaporation tube or applied to a condenser as a condensation tube, can be used as a dual-purpose tube, and provides a key condition for development of heat pump units.

To realize the above objectives, the present disclosure adopts the following technical solutions:

An outer finned tube with a mixed-wettability surface includes a tube body, where an outer wall of the tube body is provided with outer fins; the outer fins are spirally arranged in an extension direction of the tube body; grid fins are arranged between two adjacent spiral parts of each of the outer fins; two ends of each grid fin are connected to two adjacent spiral parts of the corresponding outer fin respectively; a gap is kept between each grid fin and the outer wall of the tube body; and there are a plurality of grid fins spaced in the extension direction of the tube body.

Further, the tube body is provided with a hydrophilic region and a hydrophobic region; the hydrophilic region is defined by the outer wall of the tube body, inner walls of the grid fins and the outer fins in an encircling way; and the hydrophobic region is defined by outer walls of the grid fins and the outer fins in a semi-encircling way.

Further, the tube body is provided with a hydrophilic region and a hydrophobic region; the hydrophobic region is defined by the outer wall of the tube body, the inner walls of the grid fins and the outer fins in an encircling way; and the hydrophilic region is defined by the outer walls of the grid fins and the outer fins in a semi-encircling way.

Further, the hydrophobic region is superficially provided with a perfluorooctyl triethoxysilane coating.

Further, the perfluorooctyl triethoxysilane coating is removed to expose a hydrophilic layer, that is, a polished layer is formed.

Further, the tube body is a copper tube, and the hydrophilic region is superficially provided with a copper oxide layer.

Further, the hydrophilic region has a contact angle of 0°, and the hydrophobic region has a contact angle of greater than or equal to 150°.

Further, an inner wall of the tube body is provided with screw threads.

A method for manufacturing an outer finned tube with a mixed-wettability surface includes the following steps of:

allowing, by machining equipment, a tube body to simultaneously do rotating motion and feeding motion;

sequentially and closely arranging a plurality of spiral outer fin rolling cutters with sequentially increasing outer diameters and extruding tooth cutters in the feeding direction of the tube body, where the spiral outer fin rolling cutter with a minimal outer diameter abuts against a start machining end of the tube body; and allowing the plurality of spiral outer fin rolling cutters with sequentially increasing outer diameters to sequentially act on an outer wall of the tube body to form outer fins perpendicular to the extension direction of the tube body, and allowing the extruding tooth cutters to extrude between adjacent spiral parts of the outer fins to form grid fins between the two adjacent spiral parts of the outer fins, where the grid fins are uniformly spaced.

Further, after the grid fins are uniformly spaced, the method further includes the following steps of:

using a copper tube as the tube body and soaking the tube body in a solution mixture of KOH and $K_2CO_3$ to generate CuO on the outer wall of the tube body, surfaces of the outer fins and surfaces of the grid fins;

according to two different preparation schemes based on two different distribution patterns of hydrophilic and hydrophobic regions, spraying a perfluorooctyl triethoxysilane solution with a low-surface-energy group to an area defined by the outer walls of the grid fins and the outer fins in a semi-encircling way to form a hydrophobic region in this area and form a hydrophilic region in an area defined by the outer wall of the tube body, the inner walls of the grid fins and the outer fins in an encircling way; or soaking the tube body in a perfluorooctyl triethoxysilane solution, polishing an area defined by the outer walls of the grid fins and the outer fins in a semi-encircling way to remove the perfluorooctyl triethoxysilane coating on a surface of the area so as to form a hydrophobic region in this area and form a hydrophilic region in an area defined by the outer wall of the tube body, the inner walls of the grid fins and the outer fins in an encircling way.

To sum up, the present disclosure has the following advantages:

The outer fins and the plurality of grid fins enlarge the outer surface area of the tube body, also form an ordered three-dimensional structure, and increase a contact area between the tube body and a working medium. An enhancing cavity is formed in an area defined by the outer wall of the tube body, the inner walls of the grid fins and the outer fins in an encircling way, and the enhancing cavity is close to the tube body. In this way, a larger degree of superheat is formed, a nucleation point is provided for a boiling/condensation process, a heat exchange performance is improved, and a heat exchange efficiency is improved. An evaporation cavity is formed in an area defined by the outer walls of the grid fins and the outer fins in a semi-encircling way, and the evaporation cavity has a larger heat transfer surface. Therefore, under an evaporation condition, a liquid working medium is promoted to enter the enhancing cavity; meanwhile, a gaseous working medium generated by evaporation is enabled to leave away from the enhancing cavity. Under the joint action of the outer finned structure and the hybrid hydrophilic and hydrophobic surface, it can well promote thinning of a condensation liquid film, a heat transfer resistance is reduced, and a condensation performance is enhanced. Therefore, the outer finned tube with a mixed-wettability surface of an embodiment of the present disclosure can be applied to an evaporator as an evaporation tube or applied to a condenser as a condensation tube, can be used as a dual-purpose tube, and provides a key condition for development of heat pump units.

REFERENCE NUMERALS OF THE DRAWINGS

1—tube body; 2—screw thread; 3—outer fins; 4—grid fins; 5—enhancing cavity; 6—evaporation cavity; 7—dextrorotary trapezoidal threaded stem; 8—spiral outer fin rolling cutter; 9—shaping cutting blade; and 10—extruding tooth cutter.

DETAILED DESCRIPTION

The present disclosure will be further described in detail below.

Figure 1:
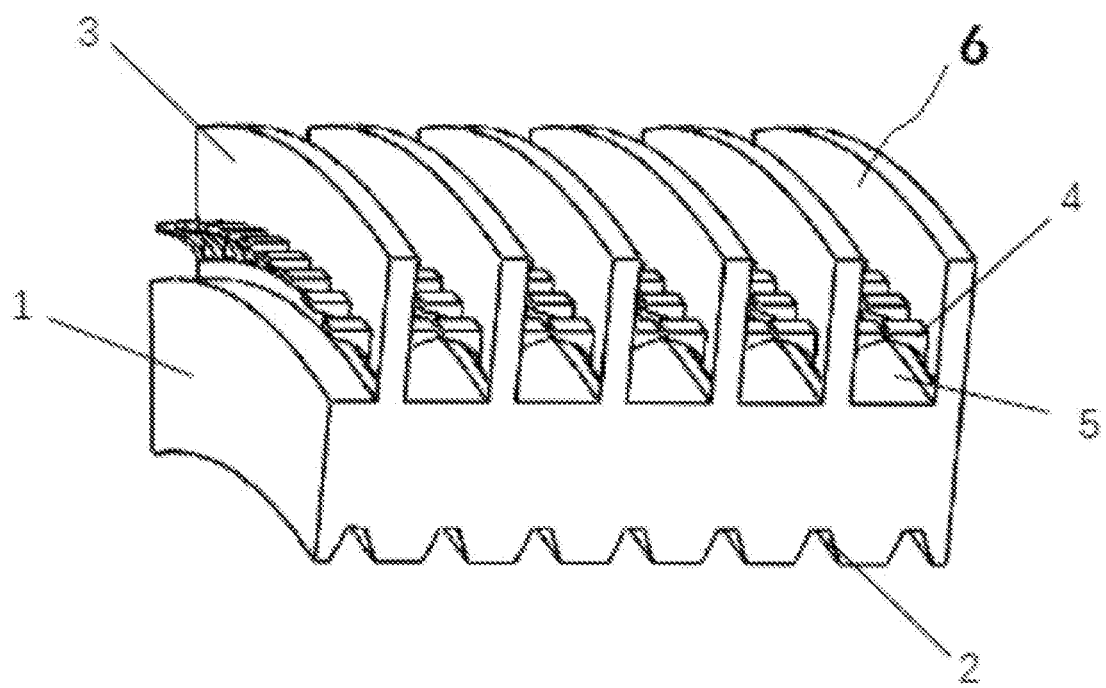
FIG. 1 is a schematic diagram of a stereochemical structure of an embodiment of the present disclosure.

As shown in FIG. 1, an outer finned tube with a mixed-wettability surface includes a tube body 1, where an outer wall of the tube body 1 is provided with outer fins 3; the outer fins 3 are spirally arranged in an extension direction of the tube body 1; grid fins 4 are arranged between two adjacent spiral parts of each of the outer fins 3; two ends of each grid fin 4 are connected to the two adjacent spiral parts of the corresponding outer fin 3 respectively; a gap is kept between each grid fin 4 and the outer wall of the tube body 1; and the plurality of grid fins 4 are spaced in the extension direction of the tube body 1.

The outer fins 3 and the plurality of grid fins 4 enlarge the outer surface area of the tube body 1, also form an ordered three-dimensional structure, and increase the contact area between the tube body 1 and a working medium. An enhancing cavity 5 is formed in an area defined by the outer wall of the tube body 1, inner walls of the grid fins 4 and the outer fins 3 in an encircling way, and the enhancing cavity 5 is close to the tube body 1. In this way, a larger degree of superheat is formed, a nucleation point is provided for a boiling/condensation process, a heat exchange performance is improved, and a heat exchange efficiency is improved. An evaporation cavity 6 is formed in an area defined by outer walls of the grid fins 4 and the outer fins 3 in a semi-encircling way, and the evaporation cavity 6 has a larger heat transfer surface. Therefore, a liquid working medium is promoted to enter the enhancing cavity 5; meanwhile, a gaseous working medium generated by evaporation is enabled to leave away from the enhancing cavity 5. In this way, it can well promote thinning of a condensation liquid film, a heat transfer resistance is reduced, and a condensation performance is enhanced. Therefore, the outer finned tube with a mixed-wettability surface of an embodiment of the present disclosure can be applied to an evaporator as an evaporation tube or applied to a condenser as a condensation tube, can be used as a dual-purpose tube, and provides a key condition for development of heat pump units.

Specifically, the outer fins 3 are perpendicular to the extension direction of the tube body 1. The outer fins 3 are formed by a plurality of spiral parts connected in sequence. Gaps are kept between the grid fins 4 and the outer wall of the tube body 1, the grid fins 4 has a lower strength than the outer fins 3, and each grid fin 4 is arranged between the two adjacent spiral parts of the corresponding outer fin 3. Therefore, the grid fins 4 can be effectively protected by the outer fins 3. An enhancing cavity 5 with a larger degree of superheat and an evaporation cavity 6 with a larger heat transfer surface can be formed in the outer surface of the tube body 1 in a way of arranging a grid fin 4 between every two spiral parts of the corresponding outer fin 3. Based on this, there is no need to arrange other fin structures on the grid fins 4. Therefore, a strength of the overall tube body 1 and that of the grid fins 4 will not be weakened, a safety is improved, and a service life is prolonged.

In this embodiment, the distance between every two spiral parts of each outer fin 3 is 0.5 mm to 0.6 mm, and each outer fin 3 has a thickness of 0.1 mm to 0.2 mm and a height of 0.1 mm to 0.2 mm.

There are 200 to 300 grid fins 4 on each circumference of the tube body 1.

The applicant found that a boiling/condensation heat transfer performance can be significantly improved by hydrophilic and hydrophobic treatments on structures of outer fins 3 outside a tube body 1. Hydrophilic and hydrophobic surfaces which are different in wettability are distributed alternately. Under a boiling working condition, a surface of a hydrophilic region can effectively lower a separation resistance of air bubbles, a surface of a hydrophobic region can provide more nucleation points and lower a start temperature of boiling. Under a condensation working condition, liquid droplets are easily formed on the surface of a hydrophobic region, such that liquid is promoted to leave away from a condensation surface. By alternate distribution of a hydrophilic region and a hydrophobic region, a size of a leaving liquid droplet can be effectively reduced, a leaving speed of the liquid droplets can be increased, and heat transfer efficiencies under an evaporation working condition and a condensation working condition can be improved.

One of the different hydrophilic and hydrophobic surface distribution patterns is as follows: the tube body 1 is provided with a hydrophilic region and a hydrophobic region; the hydrophilic region is defined by the outer wall of the tube body 1, the inner walls of the grid fins 4 and the outer fins 3 in an encircling way; and the hydrophobic region is defined by the outer walls of the grid fins 4 and the outer fins 3 in a semi-encircling way.

The hydrophilic region is arranged in an enhancing cavity 5 defined by the outer wall of the tube body 1, the inner walls of the grid fins 4 and the outer fins 3 in an encircling way; and during boiling heat exchange, the hydrophilic region in the enhancing cavity 5 is hydrophilic. In this way, the capillary property of a working medium is improved, and a critical heat exchange power is increased.

The hydrophobic region is arranged in an evaporation cavity 6 defined by the outer walls of the grid fins 4 and the outer fins 3 in a semi-encircling way, and the hydrophobic region in the evaporation cavity 6 can provide more nucleation points to lower a start boiling temperature.

During condensation heat transfer, the hydrophobic region in the evaporation cavity 6 can promote condensation of liquid droplets of a working medium; the condensed liquid droplets are agglomerated to leave away from the surface of a heat exchange tube from the hydrophilic region in the enhancing cavity 5 at a higher frequency; the hydrophilic region in the enhancing cavity 5 is capable of effectively adjusting a size and a leaving speed of the liquid droplets during condensation of the liquid droplets; and thus condensation heat transfer performance is enhanced under the action of areas different in wettability in a structure outside the tube body 1.

Another of the different hydrophilic and hydrophobic surface distribution patterns is as follows: the tube body 1 is provided with a hydrophilic region and a hydrophobic region; the hydrophobic region is defined by the outer wall of the tube body 1, the inner walls of the grid fins 4 and the outer fins 3 in an encircling way; and the hydrophilic region is defined by the outer walls of the grid fins 4 and the outer fins 3 in a semi-encircling way.

The hydrophobic region is arranged in an enhancing cavity 5 defined by the outer wall of the tube body 1, the inner walls of the grid fins 4 and the outer fins 3 in an encircling way, and the hydrophobic region in the enhancing cavity 5 can provide more nucleation points to lower a start boiling temperature.

The hydrophilic region is arranged in an evaporation cavity 6 defined by the outer walls of the grid fins 4 and the outer fins 3 in a semi-encircling way; and during boiling heat transfer, the hydrophilic region in the evaporation cavity 6 is hydrophilic. In this way, the capillary property of a working medium is improved, and a critical heat transfer power is increased.

During condensation heat transfer, the hydrophobic region in the enhancing cavity 5 can promote condensation of liquid droplets of a working medium; the condensed liquid droplets are agglomerated to leave away from the surface of a heat exchange tube from the hydrophilic region in the evaporation cavity 6 at a higher frequency; the hydrophilic region in the evaporation cavity 6 is capable of effectively adjusting a size and a leaving speed of the liquid droplets during condensation of the liquid droplets; and thus condensation heat transfer is enhanced under the action of areas different in wettability in a structure outside the tube body 1.

The hydrophobic region is superficially provided with a perfluorooctyl triethoxysilane coating.

By arranging the perfluorooctyl triethoxysilane coating, the hydrophobicity of the hydrophobic region is improved.

The perfluorooctyl triethoxysilane coating is removed to expose a hydrophilic layer, that is, a polished layer is formed.

The polished layer further improves the hydrophobicity of the hydrophobic region and enhances a condensation heat transfer effect.

The tube body 1 is a copper tube, and the hydrophilic region is superficially provided with a copper oxide layer.

As the copper oxide layer is rough, it can effectively improve the hydrophilcity of the hydrophilic region.

The hydrophilic region has a contact angle of 0°, and the hydrophobic region has a contact angle of greater than or equal to 150°. The hydrophilic region has a better hydrophilcity, and the hydrophobic region has a better hydrophobicity, therefore a condensation heat transfer effect can be enhanced.

The inner wall of the tube body 1 is provided with screw threads 2.

The structure of the screw thread 2 on the inner wall of the tube body 1 provides a larger inner surface area and also generates disturbance to a working medium flowing in the tube body 1, therefore a convective heat exchange performance in the tube body 1 is enhanced.

Figure 2:
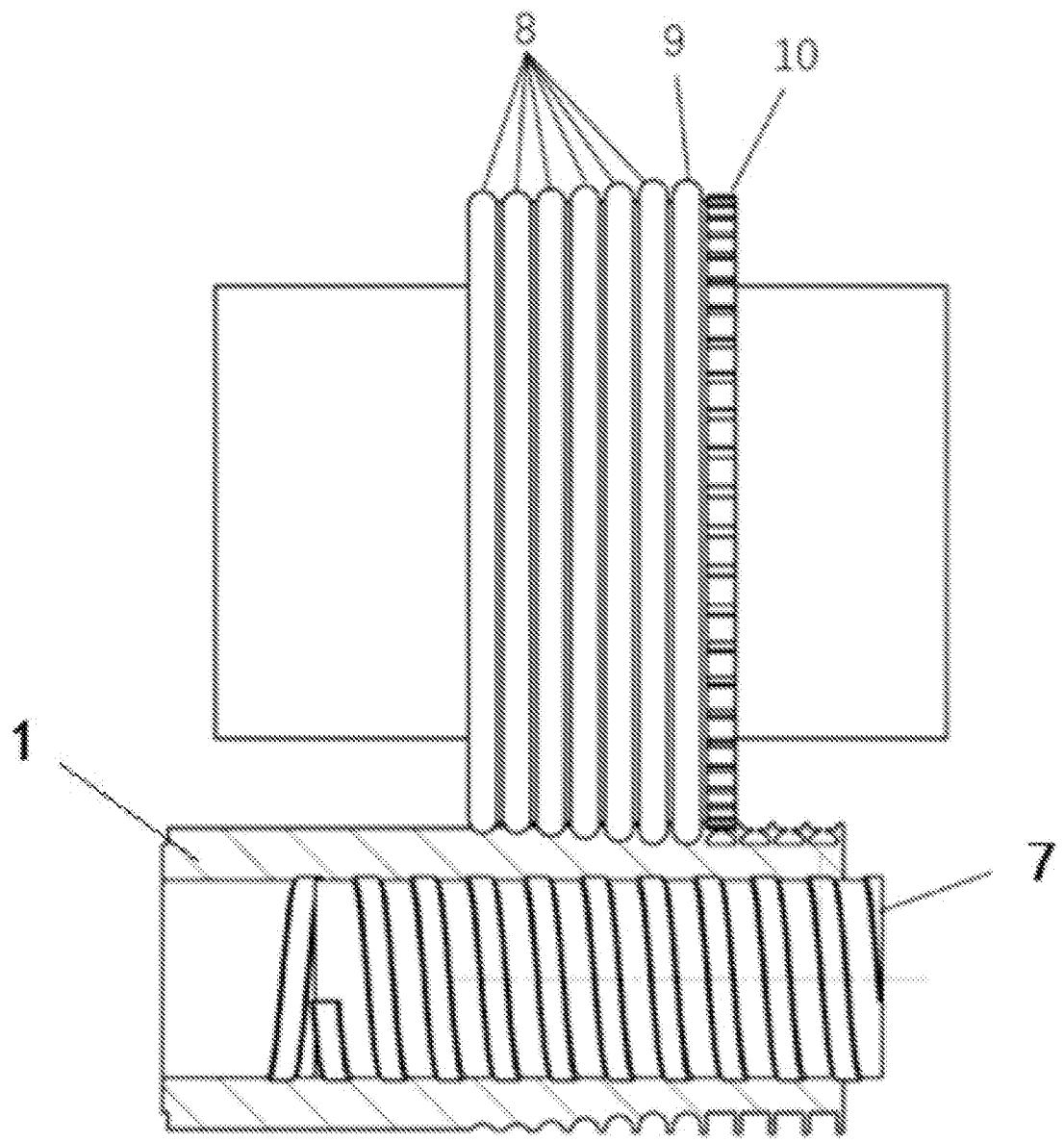
FIG. 2 is a schematic diagram showing a formation process of an embodiment of the present disclosure.

As shown in FIG. 2, a method for manufacturing an outer finned tube with a mixed-wettability surface includes the following steps of:

allowing, by machining equipment, the tube body 1 to simultaneously do rotating motion and feeding motion;

sequentially and closely arranging a plurality of spiral outer fin rolling cutters 8 with sequentially increasing outer diameters and extruding tooth cutters in a feeding direction of the tube body 1, where the spiral outer fin rolling cutter 8 with a minimal outer diameter abuts against the start machining end of the tube body 1; and allowing the plurality of spiral outer fin rolling cutters 8 with sequentially increasing outer diameters to sequentially act on the outer wall of the tube body 1 to form outer fins 3 perpendicular to the extension direction of the tube body 1, forming the outer fins 3 perpendicular to the extension direction of the tube body 1 on the outer wall of the tube body 1 by the plurality of spiral outer fin rolling cutters 8, and allowing the extruding tooth cutters 10 to extrude between adjacent spiral parts of the outer fins 3 to form grid fins between the two adjacent spiral parts of the outer fins 3, where the grid fins 4 are uniformly spaced.

In a formation process, the spiral outer fin rolling cutter 8 with a minimal outer diameter firstly acts on the tube body 1. By sequential actions of the plurality of spiral outer fin rolling cutters 8, outer fins 3 perpendicular to the extension direction of the tube body 1 are formed on the tube body 1. The extruding tooth cutters 10, following the spiral outer fin rolling cutter 8 with a maximal outer diameter, act on the tube body 1 to form grid fins 4 between two spiral parts of the outer fins 3, where the grid fins 4 are uniformly spaced. An enhancing cavity 5 with a higher degree of superheat and an evaporation cavity 6 with a larger heat transfer area can be formed on the tube body 1 without more complicated cutters or more machining steps. Therefore, a machined outer finned tube can be applied to an evaporator as an evaporation tube or applied to a condenser as a condensation tube, and provides a key condition for development of heat pump units.

In this embodiment, there are 6 spiral outer fin rolling cutters 8. After machining and formation start, the 6 spiral outer fin rolling cutters 8 sequentially act on the outer surface of the tube body 1; the first spiral outer fin rolling cutter 8 extrudes to form a spiral outer fin 3 with a relatively low height, and finally outer fins 3 with certain heights and perpendicular to the extension direction of the tube body 1 are formed after the sixth spiral outer fin rolling cutter 8 stops.

An outer acting surface of each spiral outer fin rolling cutter 8 is an arc surface; the 6 spiral outer fin rolling cutters 8 have gradually increasing outer diameters within a range from 65 mm to 72 mm and have thicknesses within a range from 0.5 mm to 0.6 mm.

Meanwhile, a dextrorotary trapezoidal threaded stem 7 may be configured to act on the inner surface of the tube body 1 to form a threaded slot structure.

In order to obtain a more regular surface structure, a shaping cutting blade 9 may be used for shaping, machining and formation to form surfaces of the outer fins 3.

The extruding tooth cutters 10 act between two spiral parts of the outer fins 3, and trapezoidal straight teeth of the extruding tooth cutters 10 extrude downward to form grid fins 4 between the two adjacent spiral parts of the outer fins 3, where the grid fins 4 are uniformly spaced.

Each extruding tooth cutter 10 is a trapezoidal straight gear type cutting blade with a thickness of 0.5 mm to 0.75 mm, an addendum circle diameter of 66.2 mm to 67 mm, a tooth height of 0.3 mm to 0.5 mm, a bottom angle of 15° to 30°, and 200 to 500 teeth.

After grid fins 4 are uniformly spaced, the method further includes the following steps of:

using a copper tube as the tube body 1 and soaking the tube body 1 in a solution mixture of KOH and $K_2CO_3$ to generate CuO on the outer wall of the tube body 1, the surfaces of the outer fins 3 and the surfaces of the grid fins 4; and specifically, sealing the two ends of the copper tube of the outer fins 3 manufactured in the previous step, soaking the copper tube in a solution mixture of KOH with a concentration of 2 mol/L to 3 mol/L and $K_2CO_3$ with a concentration of 0.05 mol/L to 0.07 mol/L for 1 h at a constant temperature of 60° C. to roughen the surface of the copper tube, taking out, washing and drying the copper tube. The surface of the copper tube is soaked to generate the following reactions:

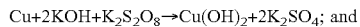

$Cu+2KOH+K_2S_2O_8 \rightarrow Cu(OH)_2+2K_2SO_4$; and

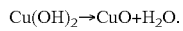

$Cu(OH)_2 \rightarrow CuO+H_2O$.

According to two different preparation schemes based on two different distribution patterns of hydrophilic and hydrophobic regions, a perfluorooctyl triethoxysilane solution with a low-surface-energy group is sprayed to an area defined by the outer walls of the grid fins 4 and the outer fins 3 in a semi-encircling way to form a hydrophobic region in this area and form a hydrophilic region in an area defined by the outer wall of the tube body 1, the inner walls of the grid fins 4 and the outer fins 3 in an encircling way; or the tube body 1 is soaked in a perfluorooctyl triethoxysilane solution, an area defined by the outer walls of the grid fins 4 and the outer fins 3 in a semi-encircling way is polished to remove the perfluorooctyl triethoxysilane coating on the surface of the area so as to form a hydrophobic region in this area and form a hydrophilic region in an area defined by the outer wall of the tube body 1, the inner walls of the grid fins 4 and the outer fins 3 in an encircling way.

Specifically, after the tube body 1 is soaked in a perfluorooctyl triethoxysilane solution for a certain time, 800-mesh and 1000-mesh abrasive paper and polishing cloth are used to sequentially polish the area defined by the outer walls of the grid fins 4 and the outer fins 3 in a semi-encircling way to make sure that hydrophobic groups on the surface of this area leave away to form a hydrophobic region with an excellent hydrophobicity, and finally an outer finned tube with a mixed-wettability surface is obtained.

The shapes, sizes, distribution and arrangement of areas different in wettability of the outer fins 3 and the grid fins 4 can be adjusted according to the size of the tube body 1 and the working condition for application, such that a desired performance can be achieved by adjustment according to different occasions.

The above embodiments are preferred embodiments of the present disclosure. However, the embodiments of the present disclosure are not limited by the above embodiments. Any change, modification, substitution, combination and simplification made without departing from the spiritual essence and principle of the present disclosure should be an equivalent replacement manner, and all are included in a protection scope of the present disclosure.

What is claimed is:

1. A method for manufacturing an outer finned tube with a mixed-wettability surface, comprising the following steps of:

allowing, by machining equipment, a tube body to simultaneously do rotating motion and feeding motion;

sequentially and closely arranging a plurality of spiral outer fin rolling cutters with sequentially increasing outer diameters and extruding tooth cutters in the feeding direction of the tube body, where the spiral outer fin rolling cutter with a minimal outer diameter abuts against a start machining end of the tube body; and allowing the plurality of spiral outer fin rolling cutters with sequentially increasing outer diameters to sequentially act on an outer wall of the tube body to form outer fins perpendicular to the extension direction of the tube body, and allowing the extruding tooth cutters to extrude between adjacent spiral parts of the outer fins to form grid fins between the two adjacent spiral parts of the outer fins, where the grid fins are uniformly spaced;

wherein after the grid fins are uniformly spaced, the method further comprises the following steps of:

using a copper tube as the tube body and soaking the tube body in a solution mixture of KOH and KiCO; to generate CuO on the outer wall of the tube body, the surfaces of the outer fins and the surfaces of the grid fins;

according to two different preparation schemes based on two different distribution patterns of hydrophillic and hydrophobic regions, spraying a perfluorooctyl triethoxysilane solution with a low-surface-energy group to an area defined by the outer walls of the grid fins and the outer fins in a semi-encircling way to form a hydrophobic region in this area and form a hydrophillic region in an area defined by the outer wall of the tube body, the inner walls of the grid fins and the outer fins in an encircling way; or soaking the tube body in a perfluoroctyl triethoxysilane solution, polishing an area defined by the outer walls of the grid fins and the outer fins in a semi-encircling way to remove the perfluoroctyl triethoxysilane coating on a surface of the area so as to form a hydrophobic region in this area and form a hydrophilic region in an area defined by the outer wall of the tube body, inner walls of the grid fins and the outer fins in an encircling way.

\* \* \* \* \*